US010963073B2

(12) United States Patent
Saito

(10) Patent No.: US 10,963,073 B2
(45) Date of Patent: Mar. 30, 2021

(54) DISPLAY CONTROL DEVICE INCLUDING POINTER CONTROL CIRCUITRY, POINTER DISPLAY METHOD, AND NON-TEMPORARY RECORDING MEDIUM THEREOF

(71) Applicant: SHARP KABUSHIKI KAISHA, Sakai (JP)

(72) Inventor: Hiroya Saito, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/116,760

(22) Filed: Aug. 29, 2018

(65) Prior Publication Data

US 2019/0064946 A1 Feb. 28, 2019

(30) Foreign Application Priority Data

Aug. 31, 2017 (JP) .............................. JP2017-167600

(51) Int. Cl.
*G06F 3/0354* (2013.01)
*G06F 3/038* (2013.01)
*G06F 3/0346* (2013.01)
*G06F 3/0484* (2013.01)

(52) U.S. Cl.
CPC .......... *G06F 3/03545* (2013.01); *G06F 3/038* (2013.01); *G06F 3/0346* (2013.01); *G06F 3/04842* (2013.01); *G06F 3/04845* (2013.01)

(58) Field of Classification Search
CPC ..... G06F 3/0346; G06F 3/03545; G06F 3/038
See application file for complete search history.

(56) References Cited

U.S. PATENT DOCUMENTS

| 2010/0156788 A1* | 6/2010 | Nakaoka | G06F 3/0346 345/158 |
| 2013/0253880 A1* | 9/2013 | Joseph | G01C 19/5776 702/150 |
| 2014/0189737 A1* | 7/2014 | Jang | H04N 21/42225 725/39 |
| 2014/0340318 A1* | 11/2014 | Stringer | G06F 3/03545 345/173 |
| 2016/0189592 A1* | 6/2016 | Kato | G09G 3/2003 345/593 |
| 2018/0181222 A1* | 6/2018 | Ivanov | G06F 3/03545 |

FOREIGN PATENT DOCUMENTS

| JP | 2003-150304 A | 5/2003 |
| JP | 2013-250805 A | 12/2013 |

* cited by examiner

Primary Examiner — Chun-Nan Lin
(74) Attorney, Agent, or Firm — ScienBiziP, P.C.

(57) ABSTRACT

A display control device includes a reception unit configured to receive sensor information from an operating device, a pointer display control unit configured to determine a motion of the operating device on the basis of the sensor information, and to display and control a pointer in conjunction with the determined motion of the operating device, and an identification display control unit configured to calculate a rotation angle of the operating device on the basis of the sensor information, and to execute control to present identification display at a position where the pointer is displayed, when the calculated rotation angle comes to a switching angle.

2 Claims, 8 Drawing Sheets

(1) POINTER IMAGE     (2) SWITCHOVER TO PIN     (3) PIN IMAGE

DISPLAY CONTROL DEVICE INCLUDING POINTER CONTROL CIRCUITRY, POINTER DISPLAY METHOD, AND NON-TEMPORARY RECORDING MEDIUM THEREOF

BACKGROUND

1. Field

The present disclosure relates to a display control device and so on, the display control device being connectable to an operating device that includes a sensor unit configured to detect, as sensor information, a displacement of the operating device, and a transmission unit configured to transmit the sensor information.

2. Description of the Related Art

A display device capable of executing control to display one or plural kinds of contents, such as a document file and an image file, is known until now. In making, for example, a presentation with the above-mentioned type of display device, it is often performed to explicitly indicate a to-be-noted part of the displayed content, such as a part being referred to in explanation.

In the above case, a method of displaying a pointer by operating an input device of a PC or another apparatus, which is connected to the display device, or a method of handwriting a stroke with an operating pen is often performed to partly highlight the content. Alternatively, a method of casting light onto the display device with a laser pointer or the like, and indicating a position to be highlighted is also performed.

In addition, there are proposed an operating pen configured to memorize a line type and a line color and to notify information set in the operating pen to a device that is an input target (see, e.g., Japanese Unexamined Patent Application Publication No. 2003-150304), and an operating pen including a colorimetric sensor that is able to detect color information of a target and to output the detected color information to a display device (see, e.g., Japanese Unexamined Patent Application Publication No. 2013-250805).

In order to, in a presentation and so on, conspicuously indicate a part to be emphasized or a part that is a specific point, it is demanded in some cases to present identification display by displaying, for example, a pin to be fixedly positioned at the relevant part. In those cases, the above-described related-art pointer has a difficulty in fixedly displaying the pin because the pointer is displayed in conjunction with the operating pen.

Furthermore, stroke input can be used to put a stroke at a position to be noted, but an input method is to be switched over each time the stroke input is performed. Thus, the related art cannot be said as being convenient in use.

SUMMARY

In view of the above-described situation, it is desirable to provide a display control device, etc., the display control device being convenient to an operator in use because a pointer display mode is switched over depending on an operation made by the operator.

According to one aspect of the present disclosure, there is provided a display control device connectable to an operating device including a sensor unit configured to detect, as sensor information, a displacement of the operating device, and a transmission unit configured to transmit the sensor information, the display control device including a reception unit configured to receive the sensor information from the operating device, a pointer display control unit configured to determine a motion of the operating device on the basis of the sensor information, and to display and control a pointer in conjunction with the determined motion of the operating device, and an identification display control unit configured to calculate a rotation angle of the operating device on the basis of the sensor information, and to execute control to present identification display at a position where the pointer is displayed, when the calculated rotation angle comes to a switching angle.

According to another aspect of the present disclosure, there is provided a display control device connectable to an operating device including a sensor unit configured to detect, as sensor information, a displacement of the operating device, and a transmission unit configured to transmit the sensor information, the display control device including a reception unit configured to receive the sensor information from the operating device, a position pointer display control unit configured to determine a motion of the operating device on the basis of the sensor information, and to display and control a position pointer in conjunction with the determined motion of the operating device, a direction pointer display control unit configured to detect a rotation angle of the operating device on the basis of the sensor information, and to display and control a direction pointer such that the direction pointer revolves around the position pointer depending on the detected rotation angle, and a pin display control unit configured to execute control to fixedly display a pin at a position where the position pointer is displayed, when the direction pointer is displayed in a posture orientated downward.

According to still another aspect of the present disclosure, there is provided a display control device connectable to an operating device, the display control device including a pointer display control unit configured to display and control a pointer in conjunction with a motion of the operating device, wherein the pointer display control unit rotates and displays the pointer depending on a rotation operation of the operating device, and the position pointer display control unit presents identification display at a position where the pointer is displayed, when the pointer is rotated and displayed in a posture orientated toward an operator side.

According to still another aspect of the present disclosure, there is provided a display method used in a display control device connectable to an operating device including a sensor unit configured to detect, as sensor information, a displacement of the operating device, and a transmission unit configured to transmit the sensor information, the display method including receiving the sensor information from the operating device; determining a motion of the operating device on the basis of the sensor information, and displaying and controlling a pointer in conjunction with the determined motion of the operating device; and calculating a rotation angle of the operating device on the basis of the sensor information, and executing control to present identification display at a position where the pointer is displayed, when the calculated rotation angle comes to a switching angle.

According to still another aspect of the present disclosure, there is provided a non-temporary recording medium storing a program to be loaded into a computer incorporated in a display control device connectable to an operating device including a sensor unit configured to detect, as sensor information, a displacement of the operating device, and a transmission unit configured to transmit the sensor information, the program causing the computer to execute receiving the sensor information from the operating device; determining a motion of the operating device on the basis of the sensor information, and displaying and controlling a pointer in conjunction with the determined motion of the operating device; and calculating a rotation angle of the operating device on the basis of the sensor information, and executing control to present identification display at a position where the pointer is displayed, when the calculated rotation angle comes to a switching angle.

DESCRIPTION OF THE EMBODIMENTS

Embodiments for implementing the present disclosure will be described below with reference to the drawings. For convenience of explanation, the embodiments are described, by way of example, in connection with the case in which a display control device according to the present disclosure is applied to a display device that is integral with a touch panel. However, the display control device according to the present disclosure can be applied to various types of display devices insofar as the display device is capable of drawing and arranging an object in accordance with an operation input made by an operator.

1. First Embodiment 1.1 Overall Configuration

Figure 1A:
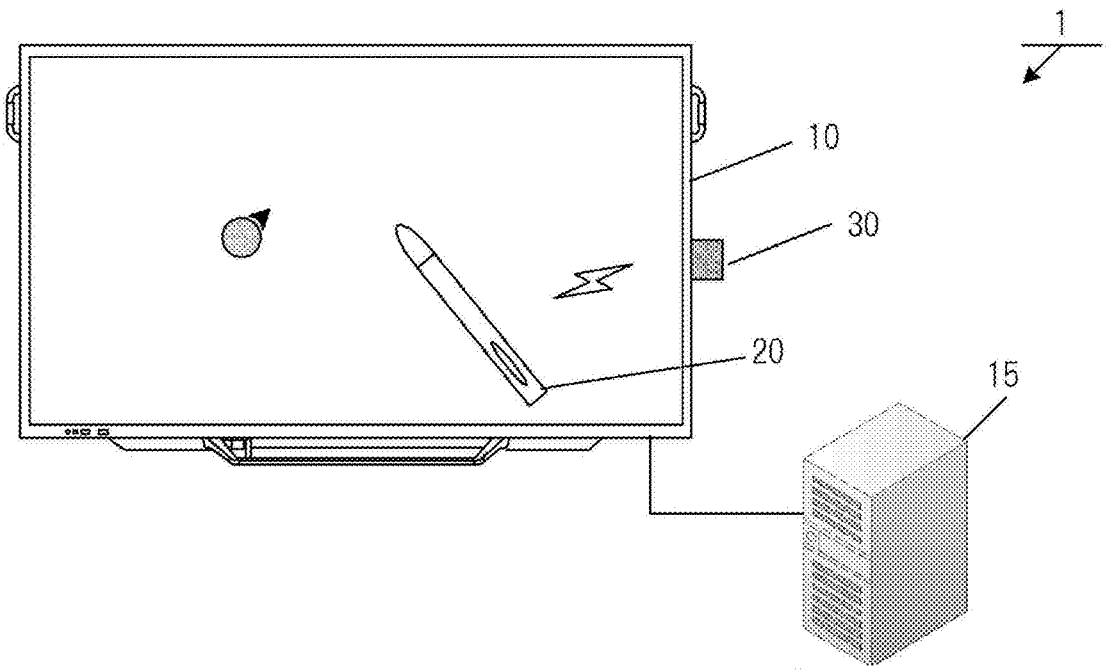
FIGS. 1A, 1B and 1C are illustrations referenced to explain an external appearance and a basic system configuration of a display system according to a first embodiment.

FIG. 1A illustrates an external appearance of a display system 1 including a display device 10, a display control device 15, an operating pen 20 to which an operating device according to the present disclosure is applied, and a reception device 30.

The display device 10 is a display device such as a liquid crystal display, for example. The display device 10 includes a touch panel on which touch input can be performed. Regarding a method of detecting the touch input, the touch panel may be of the electrostatic type or the pressure sensitive type. In other words, the touch panel may be of the desired type insofar as it can appropriately receive the operation input made by the operator, such as the touch input.

Touching to the touch panel may be performed by a method using a finger of the operator or the operating pen 20. The operating pen 20 includes one or more buttons that can be operated by the operator, and a function unit that detects a movement and an inclination of the operating pen 20. Furthermore, the operating pen 20 transmits sensor information, including a state of each button and the movement and the inclination of the operating pen 20, to the reception device 30 connected to the display device 10.

The display control device 15 is constituted by the so-called computer and is connected to the display device 10. Here, the display control device 15 and the display device 10 are connected using HDMI (registered trademark), D-SUB, or DVI, for example, in order to display objects and various items of information. Moreover, the display control device 15 is connected to the display device 10 using a USB, for example, in order to obtain information, such as touch coordinates, from the display device 10.

The display control device 15 may be incorporated in the display device 10. In other words, the display device 10 may include the display control device 15, and both the devices may be constituted as an integral unit. For convenience of explanation, the following description is made on an assumption that the functions of the display control device 15 are incorporated in the display device 10.

The reception device 30 is a device that receives the sensor information transmitted from the operating pen 20, and that outputs the received sensor information to the display device 10. The sensor information received by the operating pen 20 may be output to the display device 10 after being converted to information capable of being processed by the display device 10. Alternatively, the received sensor information may be directly output as it is.

The operating pen 20 and the reception device 30 may be connected to each other via radio communication, for example. The connection between them may be implemented with radio communication using Bluetooth (registered trademark), ZigBee (registered trademark), IrDA (Infrared Data Association), or a wireless USB, for example. The following description is made on an assumption that the reception device 30 and the operating pen 20 in this embodiment are connected to each other using BLE (Bluetooth Low Energy) with which low power communication can be realized. When the display device 10 includes a transmission and reception unit capable of communicating with the operating pen 20, the operating pen 20 and the display device 10 may be directly connected to each other without utilizing the reception device 30.

Figure 1B:
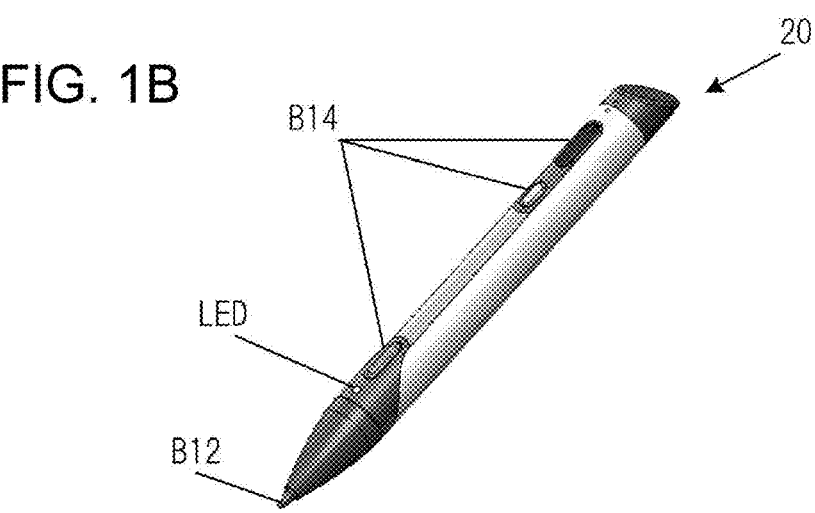

The operating pen 20 in this embodiment is described here. FIG. 1B illustrates an external appearance of the operating pen 20. For instance, when a pen tip B12 of the operating pen 20 is constituted by a conductive member, the operating pen 20 can be used to perform operation input on the touch panel of the electrostatic type. Furthermore, when a pressure sensitive sensor is disposed in the pen tip B12, the operating pen 20 can detect pen pressure, etc.

The operating pen 20 further includes state-indicating LEDs. The LEDs are used to indicate states, and are able to notify a battery state, a communication state, etc. Some of the LEDs may be utilized from the application side in such a way as indicating, for example, a color that can be drawn by the touch pen.

Moreover, the operating pen 20 includes one or more operation buttons B14. Various operations can be executed using the operation buttons B14. Functions assigned to the operation buttons B14 may be set in advance. Alternatively, a user may assign desired functions to the operation buttons B14.

The LEDs and the operation buttons B14 are arranged on the upper side of the operating pen 20 to lie on a linear line.

Thus, the operator can visually recognize the LEDs and check the states during the operation.

When the plural operation buttons B14 are disposed, an operation key used in a drawing mode (e.g., a mode of drawing an object, such as a line, a figure, or a character, on a screen, or a mode of selecting the object by touching the screen) may be assigned to a region on the side closer to the pen tip, and an operation key used in a presentation mode (e.g., a mode of turning over a page of a displayed slide, or a mode of displaying a pointer) may be assigned to a region on the rear side (tail side) of the pen.

In addition, a 6-axis sensor (3-axis acceleration sensor+ 3-axis gyrosensor) is incorporated as a motion detection unit, and it can detect a posture and a movement of the operating pen 20. More specifically, the 6-axis sensor detects the posture (inclination) of the operating pen 20 mostly with the aid of the acceleration sensor, and detects the movement of the operating pen 20 mostly with the aid of the gyrosensor. By utilizing values output from those two sensors, it is possible to detect movements of the operating pen 20 in up-down and right-left directions, and to detect a rotation of the operating pen 20 (i.e., a rotation angle of the operating pen 20 with a center axis of the operating pen 20 defined as a rotation axis).

The motion detection unit detects the posture of the operating pen 20 on an assumption that the side where the operation buttons B14 are arranged is an upper side. Thus, when the operation buttons B14 are positioned on the upper side, the rotation angle of the operating pen 20 is 0 degree. When the operation buttons B14 are rotated clockwise through 90 degrees from the position at which the operation buttons B14 are present on the upper side, the operating pen 20 is regarded as being rotated through +90 degrees and +90 degrees are detected as the rotation angle. When the operation buttons B14 are rotated counterclockwise through 90 degrees from the position at which the operation buttons B14 are present on the upper side, the operating pen 20 is regarded as being rotated through −90 degrees and −90 degrees (or +270 degrees) are detected as the rotation angle.

A basic configuration of the display system according to this embodiment will be described below with reference to FIG. 1C. In this embodiment, when the operator moves the operating pen 20 in the up-down and right-left directions, the pointer (pointer image) displayed on the display device 10 is moved in conjunction with the movement of the operating pen 20. Thus, a similar function to that of the so-called pointer utilized in a presentation, etc. is realized.

This embodiment is able to display not only the pointer (pointer image) that is displayed in conjunction with the motion of the operating pen 20, but also a pin (pin image) that is not moved in conjunction with the motion of the operating pen 20, and that provides identification display presented at a fixed position. A display mode can be switched over from pointer display to pin display with a predetermined operation.

The pointer is first described. The pointer image displayed as a pointer P10 in this embodiment is an image denoted by (1) in FIG. 1C. Here, the pointer P10 is constituted by a position pointer P12 that basically indicates a pointer position, and a direction pointer P14 that indicates a direction of the pointer.

The position pointer P12 has a substantially circular shape and indicates a position at which the pointer is present. Furthermore, the direction pointer P14 is disposed to be able to move (revolve) along a periphery of the position pointer P12.

For instance, when the operator twists (turns) the operating pen 20, the direction pointer P14 is moved and displayed while revolving around the position pointer P12 in conjunction with the twist of the operating pen 20. In FIG. 1C, the direction pointer P14 has a substantially triangular shape. This is because the direction pointer desirably has a shape with an apex pointed in a direction to be denoted by the direction pointer. Accordingly, the direction pointer may have a substantially arrow-like shape or a projected shape, for example, other than the substantially triangular shape. Thus, the shape of the direction pointer is just enough to enable the operator to understand the direction indicated by the direction pointer without being limited to the shape having the apex. In practice, the direction pointer may have a substantially mountain-like shape.

When the operator turns the operating pen 20 in a leftward direction, the direction pointer P14 is moved in a direction denoted by DL and is displayed there. When the operator turns the operating pen 20 in a rightward direction, the direction pointer P14 is moved in a direction denoted by DR and is displayed there.

Thus, since the direction pointer P14 can be displayed along the periphery of the position pointer P12, the operator can visually recognize the pointer (pointer image) P10 as if the pointer is displayed while rotating in its entirety. Accordingly, the operator can perform an operation of properly indicating a position to be indicated (e.g., a rough position to be noted) with the position pointer P12, and a position to be more finely indicated (e.g., a fine character or numeral to be noted) with the direction pointer P14.

Although this embodiment is described in connection with the position pointer P12 displayed without being rotated, and the direction pointer P14 displayed while revolving along the periphery of the position pointer P12, the pointer P10 may be displayed as one integral pointer. In that case, the pointer P10 is moved and displayed in conjunction with the movement of the operating pen 20, and is rotated and displayed in conjunction with the detected rotation angle of the operating pen 20.

The position pointer P12 is desirably displayed in a larger size than the direction pointer P14. However, the position pointer P12 may have the same size as the direction pointer P14, or the direction pointer P14 may have a larger size. Furthermore, the position pointer P12 and the direction pointer P14 may be displayed in the same color or in different colors.

Switchover from the pointer to the pin, which is presented as one type of identification display, will be described below. As illustrated in (2) of FIG. 1C, when the operator twists the operating pen 20 in a direction denoted by DL2 to be oriented downward, the direction pointer P14 is moved to and displayed at the illustrated position after revolving around the position pointer P12.

Figure 1C:
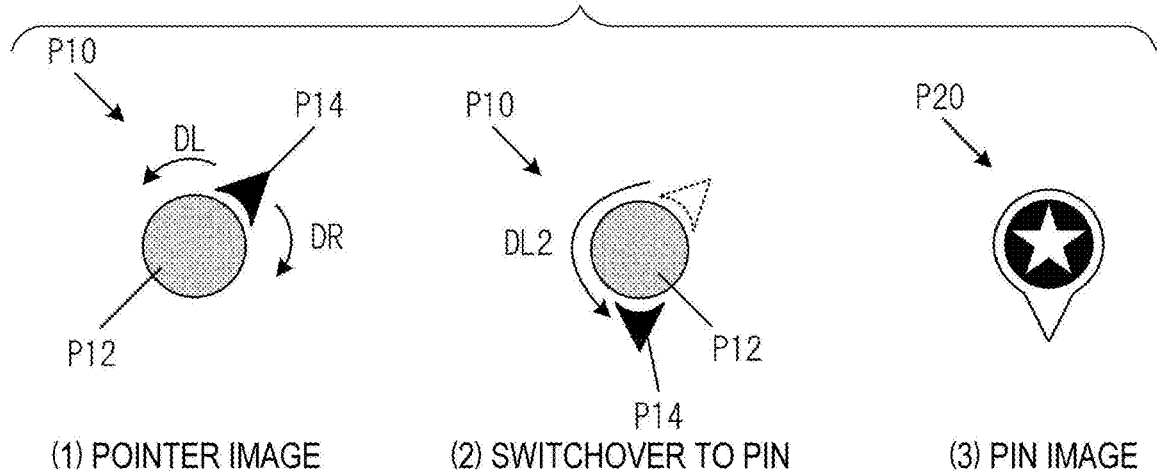

At the timing when the position of the direction pointer P14 (i.e., the direction indicated by the direction pointer) is located or oriented downward (namely, when the rotation angle is substantially 180 degrees), the display mode is switched over from the pointer image to a pin image P20 as illustrated in (3) of FIG. 1C. At that timing, the pin image is not yet in a determined state, and represents a situation that the pin image can be fixedly displayed with a subsequent operation by the operator.

In other words, the pointer is displayed in conjunction with the motion of the operating pen 20 during the operation by the operator (e.g., during a period in which the operator is depressing the operation button), whereas the pin is fixedly displayed as the pin image at the displayed position upon the operator performing an operation in the state of the pin being displayed.

According to this embodiment, as described above, the pointer image and the pin image are displayed in conjunction with the motion of the operating pen 20. Furthermore, the pointer and the pin can be easily switched over with the operation made by the operator.

Although this embodiment is described in connection with the case of performing the identification display using the shape of a "pin", the identification display may be performed using another desired shape, such as a substantially star-like shape, a substantially circular shape having a different color from that of the pointer, or a shape representing a character, in addition to the pin-like shape. The following description is made on an assumption that the identification display is performed using the pin.

1.2 Functional Configurations

Figure 2:
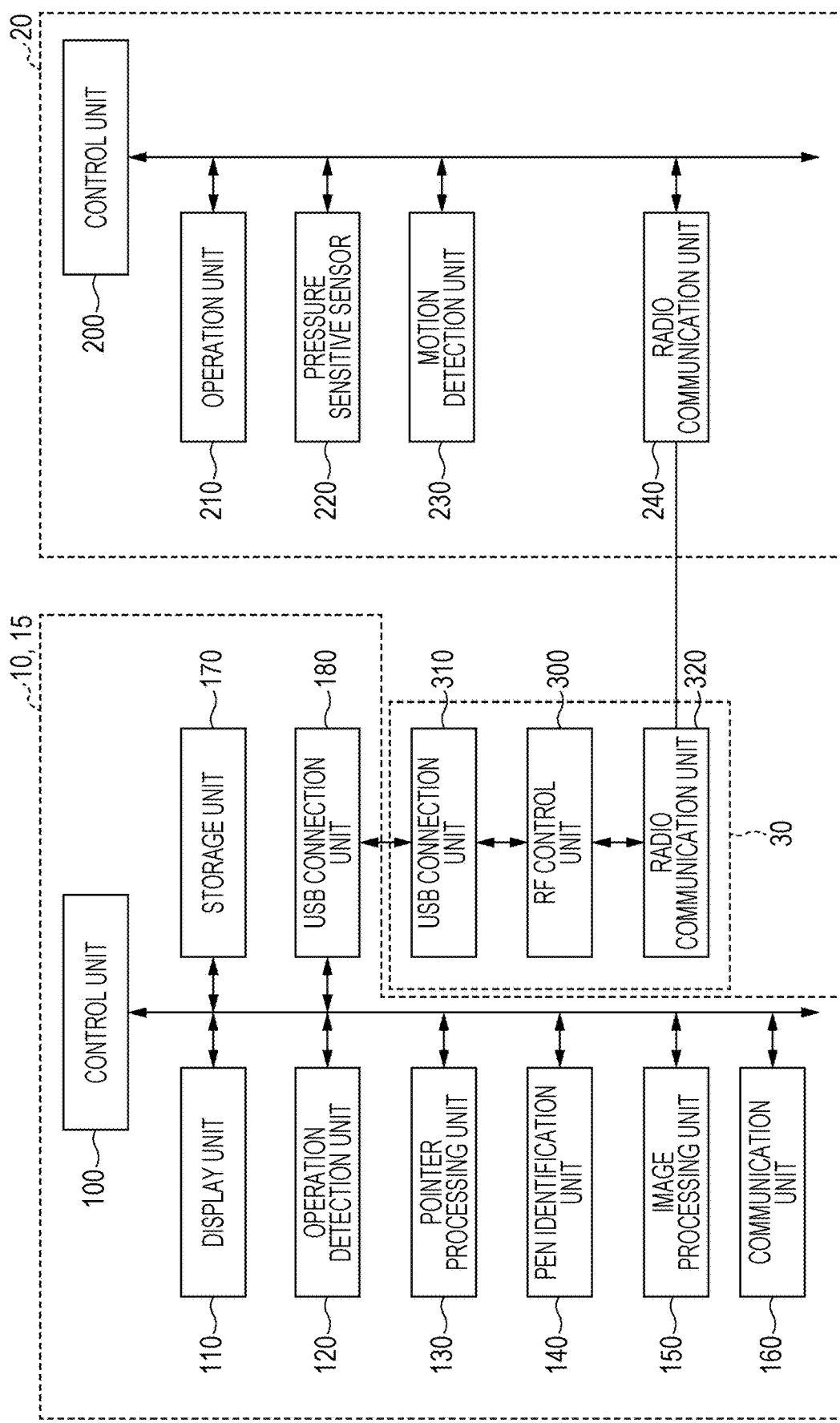
FIG. 2 is a block diagram referenced to explain functional configurations of a display device, an operating device, and a communication device according to the first embodiment.

Functional configurations of the individual devices will be described below with reference to FIG. 2. FIG. 2 is a block diagram referenced to explain the functional configurations of the display device 10 (including the display control device 15), the operating pen 20, and the reception device 30. In this embodiment, the display device 10 and the reception device 30 are connected to each other using a USB connection unit 180 disposed in the display device 10 and a USB connection unit 310 disposed in the reception device 30.

1.2.1 Functional Configuration of Display Device

The display device 10 includes a control unit 100, a display unit 110, an operation detection unit 120, a pointer processing unit 130, a pen identification unit 140, an image processing unit 150, a communication unit 160, a storage unit 170, and the USB connection unit 180. Although this embodiment is described on an assumption that the display control device 15 is incorporated in the display device 10, the display control device 15 may be a separate device having specific functions depending on cases.

The control unit 100 is a function unit for controlling the entirety of the display device 10. The control unit 100 implements various functions by reading and executing various programs stored in the storage unit 170, and it is constituted, for example, by a CPU (Central Processing Unit) and so on.

The display unit 110 is a function unit for displaying various items of information to be notified to the operator, and for displaying objects. In this embodiment, the display unit 110 additionally performs pointer display and pin display, which are described later. The display unit 110 is constituted by an LCD (Liquid Crystal Display) or an organic EL display, for example.

Furthermore, the display unit 110 includes a display screen on which objects are displayed. The display screen may be constituted by one or more regions. The objects may be not only contents such as characters, figures, or photos (images), but also documents and moving images.

The operation detection unit 120 is a function unit for detecting the operation made by the operator. The operation detection unit 120 is constituted, for example, by a touch panel integral with the display unit 110, or by hardware buttons. Detection of an operation using the touch panel may be performed by a desired method of the electrostatic type, the pressure sensitive type such as using a resistance film, the infrared type, or the electromagnetic induction type.

The pointer processing unit 130 is a function unit for calculating the position and the inclination of the pointer (i.e., the pointer position and inclination), which is to be displayed on the display unit 110, on the basis of the sensor information received from the operating pen 20, and for managing an image displayed as the pointer, i.e., the pointer image.

The pen identification unit 140 is a function unit for identifying the operating pen 20. The operating pen 20 is identified by a method of utilizing a serial number or a MAC address, for example, as unique identification information based on which the operating pen 20 can be identified.

The image processing unit 150 is a function unit for executing processing of an image to be displayed on the display unit 110. The image processing unit 150 can output an image after executing, as general image processing, a sharpening process and a color adjustment process, for example, on image data. Moreover, in this embodiment, the image processing unit 150 executes image processing to display the pointer image (pin image) in a superimposed relation to the image (content) being displayed.

The communication unit 160 is a function unit enabling the display device 10 to communicate with an external device. The communication unit 160 is implemented using a NIC (Network Interface Card) utilized in wired/wireless LAN, or a communication module that can be connected to a 3G/LTE line.

The storage unit 170 is a function unit in which various programs and various data used in operations of the display device 10 are stored. The storage unit 170 is constituted by a semiconductor memory such as an SSD (Solid State Drive), or by a HDD (Hard Disk Drive), for example.

The USB connection unit 180 is a connection interface for connection of a USB device. In this embodiment, the reception device 30 is connected as the USB device. The function of the reception device 30 is described later. The USB connection unit 180 is constituted using an interface in conformity with USB2.0/3.0/3.1.

1.2.2 Functional Configuration of Operating Pen

The functional configuration of the operating pen 20 will be described below. The operating pen 20 includes a control unit 200, an operation unit 210, a pressure sensitive sensor 220, a motion detection unit 230, and a radio communication unit 240.

The control unit 200 is a function unit for controlling the entirety of the operating pen 20. The control unit 200 is constituted, for example, by a CPU and so on.

The operation unit 210 is a function unit for detecting the operation made by the operator. For instance, when the operating pen 20 includes one or more buttons, the operation unit 210 detects a state of the one or more buttons (namely, whether the button is depressed or which one of the buttons is depressed). The detected state of the one or more buttons is transmitted to the display device 10 together with the sensor information. The operation unit 210 is constituted, for example, by the operation buttons B14 illustrated in FIG. 1B.

The pressure sensitive sensor 220 is a function unit for detecting a depression depth (i.e., a depression amount) by which the pen tip of the operating pen 20 is depressed against the touch panel. A method of detecting the depression amount can be implemented with a known technique. When an operation of drawing a stroke on the display device 10 is performed on the display device 10 using the operating pen 20, a width or transparency of the stroke may be changed depending on the depression amount detected by the pressure sensitive sensor 220. The pressure sensitive sensor 220 is connected, for example, to the pen tip B12 illustrated in FIG. 1B.

The motion detection unit 230 is a function unit for detecting a motion of the operating pen 20, and it is constituted by various sensors. In this embodiment, the motion detection unit 230 includes a 3-axis gyrosensor (angular speed sensor) that detects a movement of the operating pen 20, and a 3-axis acceleration sensor that detects an inclination of the operating pen 20.

The 3-axis gyrosensor detects and outputs angular speeds of rotations about three axes, for example, a yaw axis, a pitch axis, and a roll axis. The 3-axis acceleration sensor detects and outputs accelerations about an X axis, a Y axis, and a Z axis. Data including the angular speeds of the rotations (i.e., the rotation speeds) and the accelerations together is output as the sensor information.

The sensor information output from the motion detection unit 230 is transmitted to the reception device 30 (or the display device 10) via the radio communication unit. The display device 10 calculates the posture, i.e., the orientation, the twist, the position, etc., of the operating pen 20 on the basis of the received sensor information.

It is assumed that the sensor information in this embodiment further includes the state of an operation performed using the operation unit 210, for example. Thus, the sensor information is information utilized to obtain the state of the operating pen 20.

The radio communication unit 240 is a function unit for transmitting the sensor information to the reception device 30 with an NFC (Near Field Communication) technique capable of establishing connection to the reception device 30 described later. The connection is established using Bluetooth (registered trademark) or BLE (Bluetooth Low Energy), for example.

1.2.3 Functional Configuration of Reception Device

The functional configuration of the reception device 30 will be described below. The reception device 30 is connected as a dongle to the display device 10, and it includes an RF (Radio Frequency) control unit 300, a USB connection unit 310, and a radio communication unit 320.

The RF control unit 300 is a function unit for executing control to convert the sensor information, which is transmitted from the radio communication unit 240 of the operating pen 20, to information capable of being processed by the display device 10, and to output the sensor information from the USB connection unit 310. The RF control unit 300 is constituted, for example, by a CPU and so on.

The USB connection unit 310 is a function unit for outputting the sensor information to the display device 10. The USB connection unit 310 is constituted using an interface in conformity with USB2.0/3.0/3.1, for example.

The radio communication unit 320 is a function unit for receiving the sensor information, which is transmitted from the operating pen 20, with a radio communication technique capable of establishing connection to the operating pen 20. The connection is established using Bluetooth (registered trademark) or BLE, for example.

1.3 Processing Flow

Figure 3:
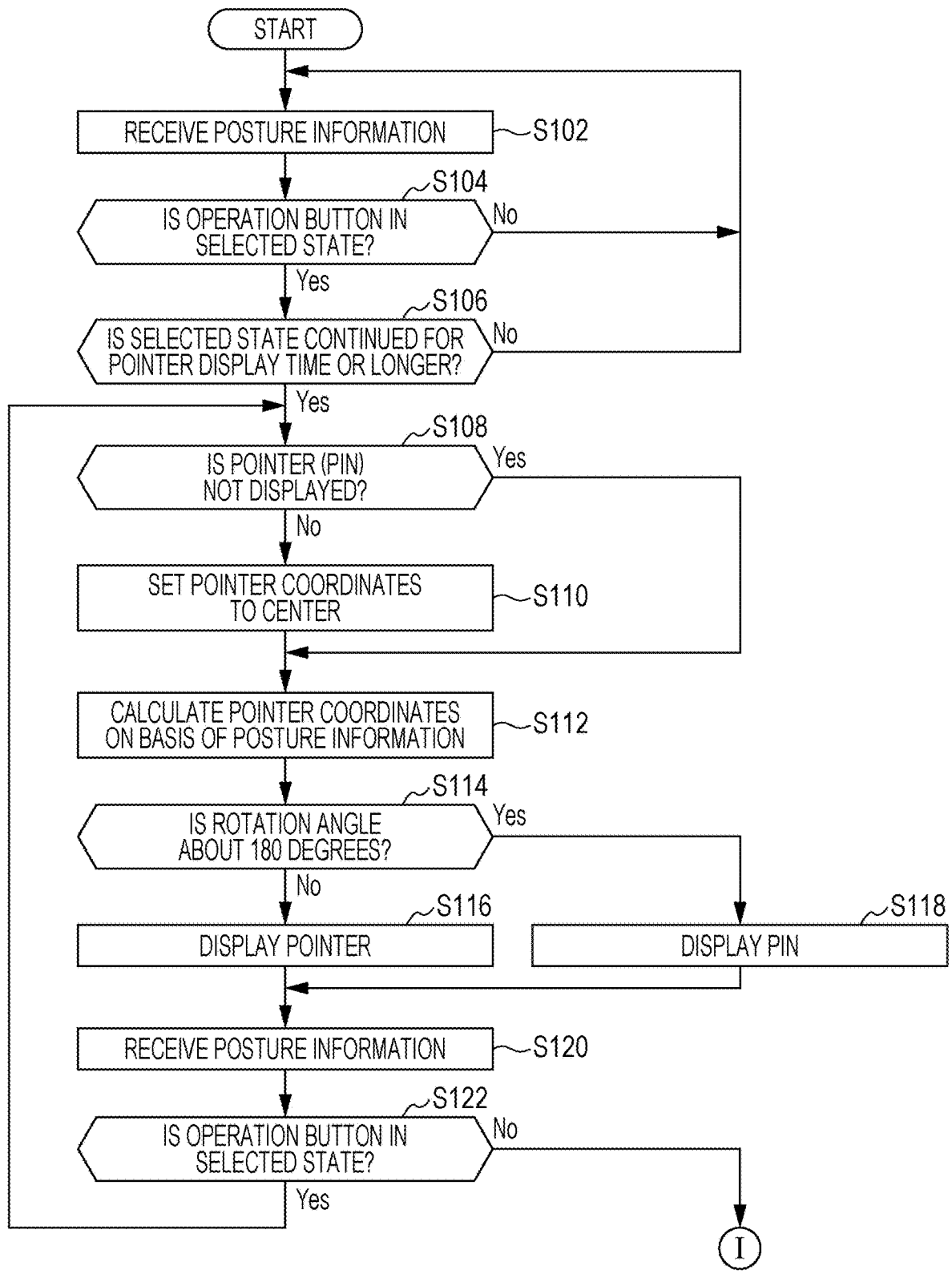
FIG. 3 is a flowchart referenced to explain a main operation of the display device in the first embodiment.
Figure 4:
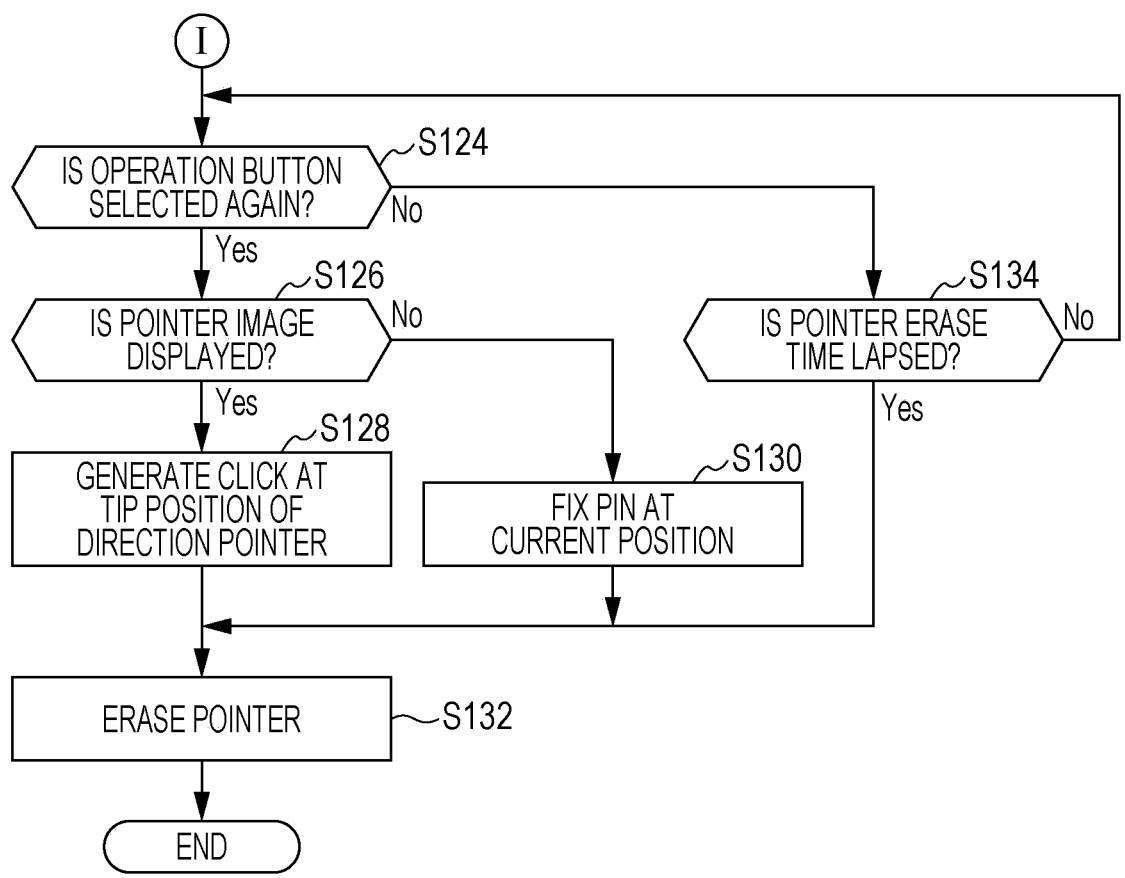
FIG. 4 is a flowchart referenced to explain the main operation of the display device in the first embodiment.

A processing flow in the first embodiment will be described below with reference to FIGS. 3 and 4. FIGS. 3 and 4 illustrate an operation flow representing a main process in the first embodiment.

In the case in which the display device 10 and the operating pen 20 are connected to each other, the sensor information is output (transmitted) from the operating pen 20 and is received by the display device 10 (step S102). The display device 10 and the operating pen 20 may be connected automatically, or may be connected in response to an appropriate operation made by the operator.

Then, it is determined on the basis of the received sensor information whether the operation button (operation switch) of the operating pen 20 is in the selected state (step S104). Here, the wording "the operation switch is in the selected state" implies, for example, that when the operation switch is the operation button, the operation button is in the depressed state, and that when the operation switch is a simple touch switch, the touch switch is in the touched state. Thus, the above wording implies that a member capable of performing operation input is being selected.

If the operation switch is selected, it is determined whether the selected state continues for a period longer than a certain time (pointer display time) (step S104; Yes→step S106). The pointer display time is a time taken until the pointer (pointer image) is displayed on the display screen. Although the pointer display time is desirably about 1 sec, it may be another predetermined time such as about 0.5 sec to 2 sec, or a value not longer than 5 sec, for example. Alternatively, the pointer display time may be a time that can be set by the operator, or may be null (i.e., 0 sec).

When the selected state of the operation button continues for the pointer display time or longer, the pointer (pointer image) is displayed. Regarding a display position of the pointer (pointer image), if the pointer (pin) image is not displayed at that time, an initial position in coordinates where the pointer is to be displayed is set to the center of the display screen (step S110).

The initial position can be set in various manners. Without being limited to the center of the display screen, the initial position may be set to, for example, a position where display of the pointer (pin) has been ended (i.e., the pointer (pin) has been erased) last time. As an alternative, the initial position may be set to the center of the displayed content, or a predetermined position (e.g., an upper left corner).

New pointer coordinates are calculated from the current pointer coordinates on the basis of the sensor information (step S112).

The term "pointer coordinates" stands for a position where the pointer or the pin to be displayed on the display device 10 is located. The calculation of the pointer coordinates is executed, by way of example, in accordance with the following procedures.

(1) When the processing of step S112 is executed for the first time, the pointer coordinates are set to the center of the display unit 110 of the display device 10 (step S110).

(2) When the processing of step S112 is executed for the second or subsequent time, new pointer coordinates are calculated on the basis of both the pointer coordinates and the received sensor information.

Here, changes in direction and angle of the operating pen 20 can be calculated by comparing the pointer coordinates, the sensor information having been received last time, and the sensor information being received at the present time. The pointer position can be calculated on the basis of those changes.

The acceleration sensor can detect the inclination of the operating pen 20 with high accuracy when the operating pen 20 remains still, but it cannot accurately detect the inclination of the operating pen 20 when the operating pen 20 is moving, or when the operating pen 20 is in a nearly vertical posture. On the other hand, the gyrosensor is highly accurate for a movement. However, when the pointer coordinates are calculated as a relative value based on accumulation of movements, errors would be accumulated if the calculation on the basis of values detected by the gyrosensor is continued for a long time.

Thus, in consideration of both the value detected by the angular speed sensor and the value detected by the acceleration sensor, the pointer coordinates may be calculated as follows.

(1) When the operating pen 20 remains still, a reference value (basic posture) is obtained using the acceleration sensor.

(2) When the operating pen 20 is moved, or when the operating pen 20 is in the nearly vertical posture, relative calculation using the gyrosensor is basically performed while the influence of the acceleration sensor is made weaker.

(3) When the operating pen 20 comes to still again, the reference value (basic posture) is obtained using the acceleration sensor.

In the above case, the pointer coordinates can be calculated with higher accuracy by calculating the pointer coordinates on the basis of the relative position with respect to the basic posture, and by obtaining the basic posture again when the operating pen 20 comes to still.

Then, it is determined whether the rotation angle of the operating pen 20 is a pin switching angle (step S114). The term "pin switching angle" stands for an angle at which the display mode is switched over from the pointer display to the pin display, and it is desirably about 180 degrees. Alternatively, the pin switching angle may be defined as a predetermined range, for example, from about 175 degrees to about 185 degrees. In other words, the pin switching angle is desirably set to an angle representing the lower side when viewed from the operator side.

When operators are present in four directions as in the case of a table display, the pin switching angle may be set to an angle representing the downward direction when viewed from each of the operators. Thus, the pin switching angle may be set, by way of example, to about 180 degrees, i.e., an angle at which the operating pen 20 used by each of the operators is oriented downward and the direction pointer is positioned toward the operator, namely at which the operation button of the operating pen 20 is oriented downward.

Although the angle of the operating pen 20 can be calculated for each operating pen, the display control device 15 may calculate the angle of each operating pen as an absolute angle. More specifically, the pin switching angle may be set to about 0 degree for the operator on the upper side, about 90 degrees for the operator on the right side, about 180 degrees for the operator on the lower side, and about 270 degrees for the operator on the left side.

The pin switching angle can be said as denoting such a position that the operation button disposed on the operating pen 20 is oriented downward. Thus, in the case of the display device 10 being in an erected state as in this embodiment, since the operator is present in a direction facing the display device 10, the pin switching angle is an angle representing the downward direction of the display device 10, i.e., about 180 degrees. The following description is made on an assumption that the pin switching angle is about 180 degrees.

If the rotation angle is not about 180 degrees, the pointer (pointer image) is displayed at the position of the pointer coordinates (step S114; No→step S116). If the rotation angle is about 180 degrees, the pointer (pointer image) is switched over to the pin (pin image), and the pin (pin image) is displayed at the position of the pointer coordinates (step S114; Yes→step S118).

As a result, the pointer image or the pin image is displayed in a superimposed relation to, for example, the content displayed on the display screen.

Then, the display device 10 receives the sensor information from the operating pen 20 and determines whether the operation button is in the selected state (step S120→step S122). If the operation button is in the selected state, the processing is repeatedly executed after returning to step S108 (step S122; Yes→step S108).

Thus, if the state in which the operation button is selected continues, the pointer image or the pin image is continuously displayed in conjunction with the motion of the operating pen 20 in accordance with the sensor information received from the operating pen 20.

If the operation button is not in the selected state (i.e., if the selected state is cleared) in step S122 of FIG. 3, it is determined again whether the operation button of the operating pen 20 is selected (step S122; Yes in FIG. 3→step S124 in FIG. 4).

If the operation button is selected again, it is determined whether the pointer image is displayed (step S124; Yes→step S126). If the pointer image is displayed, a click interruption is caused to generate at the coordinates of a tip position of the direction pointer (step S126; Yes→step S128). In other words, an item or a link can be selected at the tip position of the pointer image.

If the pin image is displayed, the pin image is fixed to a position (pin position) at which the pin image is displayed (step S126; No→step S130). Thereafter, the pointer (pin) image is erased (step S132).

If the operation button of the operating pen 20 is not selected, it is determined whether a pointer erase time has lapsed (step S124; No→step S134). If the pointer erase time has lapsed, the pointer is erased (step S134; Yes→step S132).

If the pointer erase time has not yet lapsed, the processing returns to step S124 (step S134; Yes→step S124). The pointer erase time is desirably about 1 to 2 seconds, but a longer or shorter time may also be selected by optional setting. In other words, although the pointer is desirably disappears after the lapse of a predetermined time, the pointer may be erased or may not be erased at the timing when the selection of the operation button is cleared.

The above embodiment has been described in connection with the case in which the display mode is switched over to the pin display when the rotation angle comes to about 180 degrees (i.e., the operating pen 20 is twisted to the pin switching angle), and in which the pointer display is continued under other conditions. However, once the display mode is switched over to the pin display, the state of the pin display may be maintained as it is. Thus, once the display mode is switched over to the pin display in response to the transition to "Yes" in step S114 of FIG. 3, the pin display may be maintained thereafter until the pin is erased.

Furthermore, the above description has been made in connection with the case in which one switching angle is set to about 180 degrees in step S114. However, two switching angles, i.e., a first switching angle and a second switching angle, may be set. In such a case, for instance, the display mode is switched over to the pin display at the first switching angle (about 180 degrees), and whether the rotation angle is at the second switching angle (about 150 to about 210 degrees) is determined in order to perform the pointer display again.

By setting two switching angles as described above, the pin display and the pointer display can be prevented from being switched over in a short time.

1.4 Operation Examples

Figure 5A:
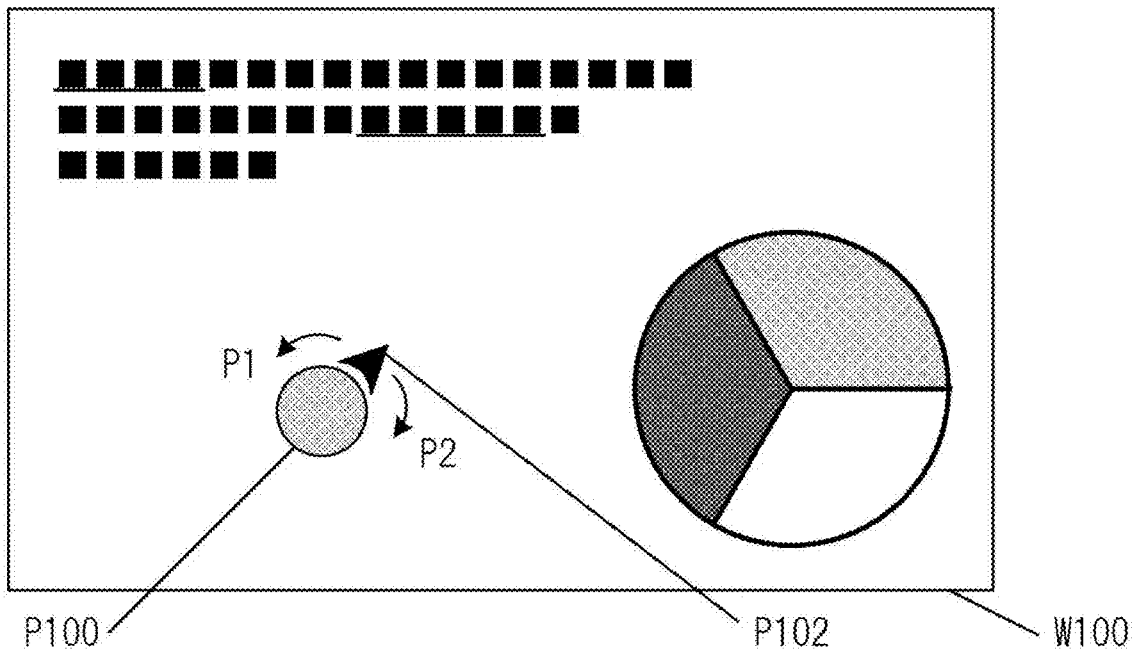
FIGS. 5A and 5B are illustrations referenced to explain an operation in the first embodiment.
Figure 5B:
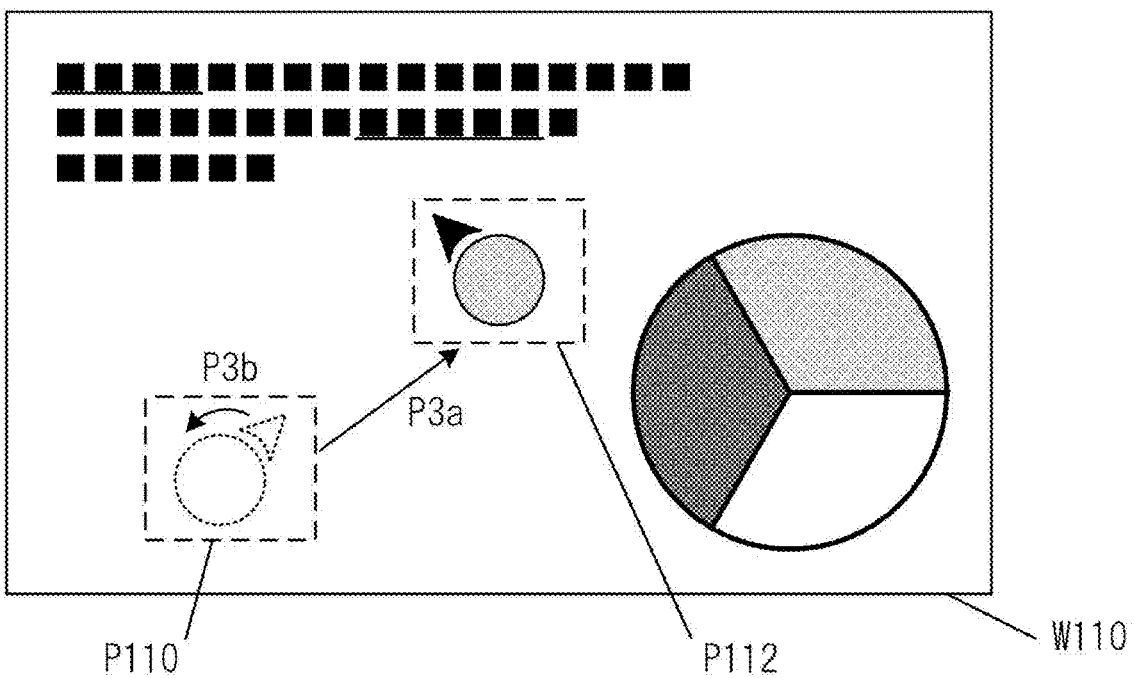

Operation examples of this embodiment will be described below with reference to the drawings. FIGS. 5A and 5B illustrate examples of the pointer display. A screen example illustrated in FIG. 5A displays, on a display screen W100, a pointer that is constituted by a position pointer P100 and a direction pointer P102. When the operator rotates the operating pen 20 counterclockwise in the above state, the direction pointer P102 is moved while revolving along a periphery of the position pointer P100 in a direction denoted by P1. Similarly, when the operator rotates the operating pen 20 clockwise, the direction pointer P102 is moved while revolving along the periphery of the position pointer P100 in a direction denoted by P2.

When the operator moves the operating pen 20 in the up-down and right-left directions, the pointer is also moved in conjunction with the movement of the operating pen 20. Furthermore, the operator can operate the operating pen 20 in combination of a movement operation and a rotation operation. Assume here, for example, that the pointer is displayed on the display screen W110 at P110 at a certain point in time as illustrated in FIG. 5B. When the operating pen 20 is moved in a direction from a lower left corner toward an upper right corner and is rotated counterclockwise from the above state, the pointer is displayed as denoted by P112. Thus, the pointer is moved in a direction denoted by P3a with the movement operation, and the direction pointer is moved in a direction denoted by P3b with the rotation operation.

Figure 6A:
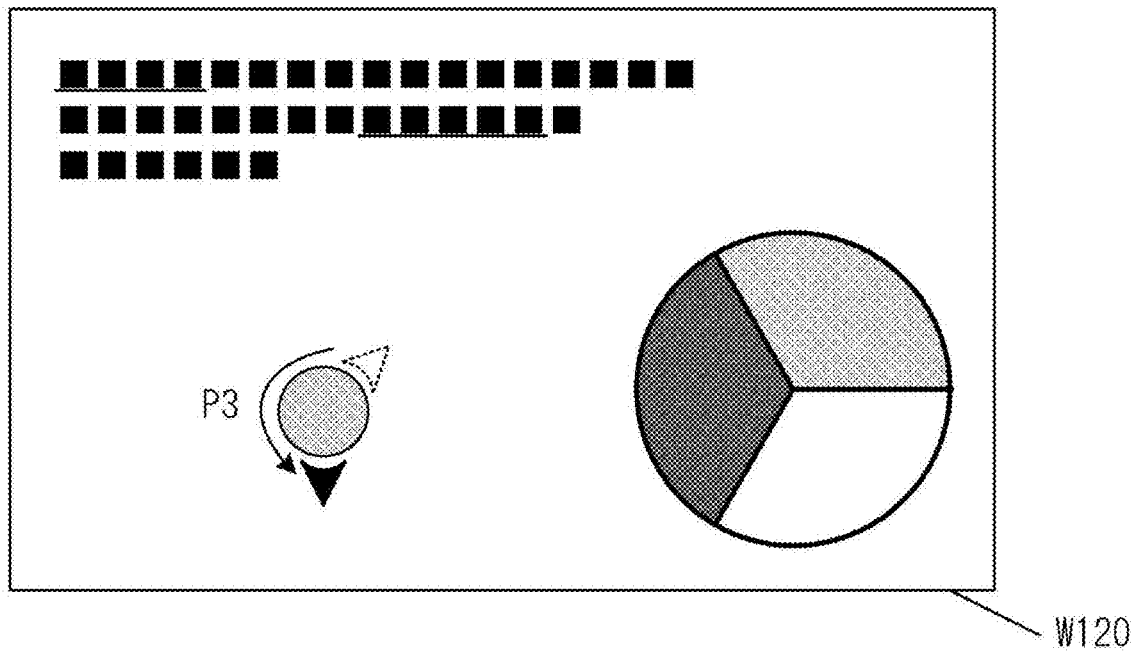
FIGS. 6A and 6B are illustrations referenced to explain an operation in the first embodiment.
Figure 6B:
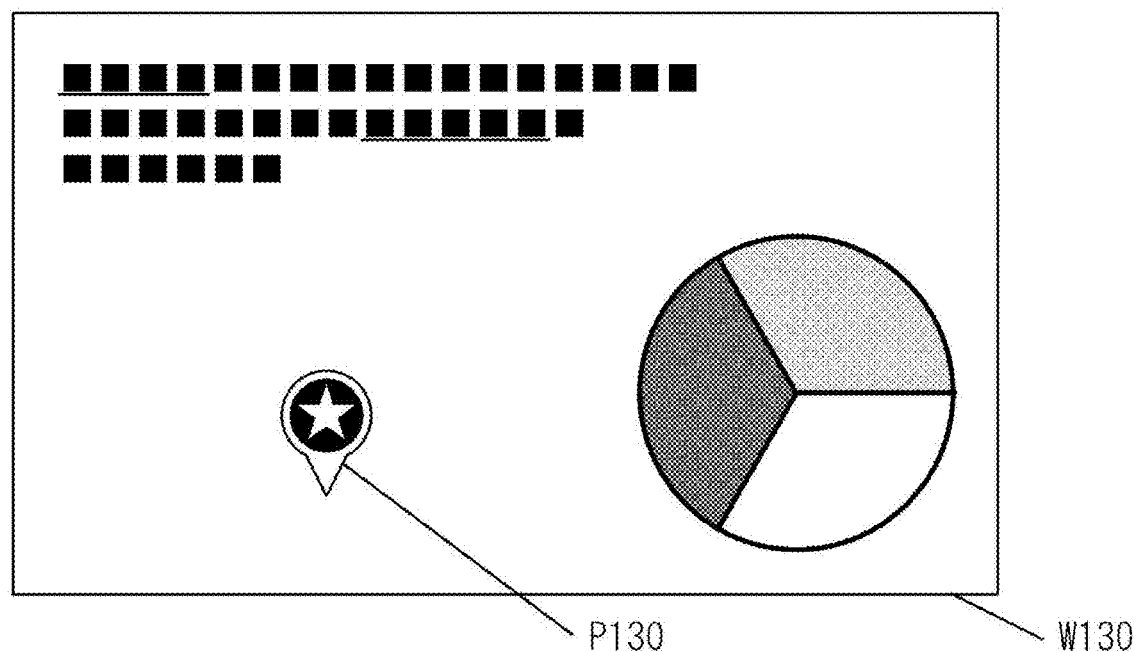

FIGS. 6A and 6B illustrate the case in which the operator twists the operating pen 20 counterclockwise and rotates the operating pen 20 to be oriented substantially toward the bottom side.

Assume that, as illustrated in FIG. 6A, the direction pointer is initially displayed on a display screen W120 at a position denoted by dotted lines. When the operator rotates the operating pen 20 counterclockwise from the above state, the direction pointer displayed on the display screen W120 is moved in a direction denoted by P3 and is shifted to a position at which the direction pointer is displayed in a posture orientated downward.

At that time, the display mode is switched over from the printer image to the pin image upon judging that the operating pen 20 has been rotated and oriented substantially toward the bottom side. Accordingly, the pin image denoted by P130 is displayed at the pointer position on a display screen W130 illustrated in FIG. 6B. By displaying the pin image instead of the pointer image as described above, the operator can visually recognize the fact that the display has been changed to a state allowing the operator to fix the pin.

Figure 7:
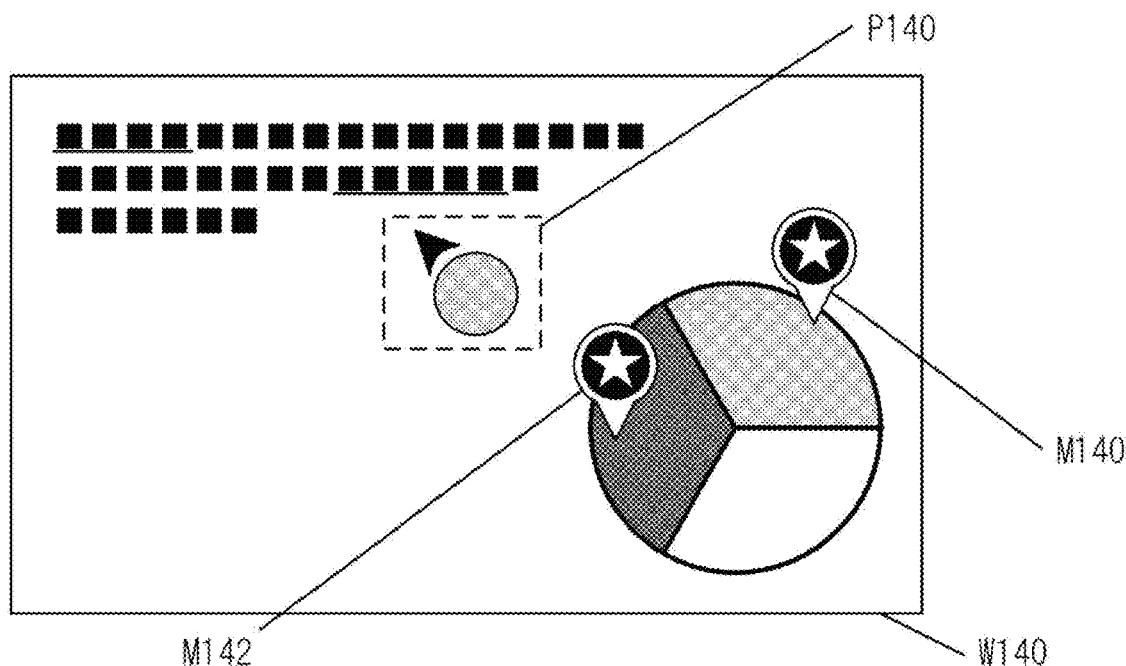
FIG. 7 is an illustration referenced to explain an operation in the first embodiment.

FIG. 7 illustrates a screen example in which two pins are fixedly displayed at positions denoted by M140 and M142, and a pointer P140 is further displayed on a display screen W140. Thus, in this embodiment, the pin can be fixedly displayed at one or more positions and can be continuously displayed at one or more fixed positions on the display screen in accordance with the operations illustrated in FIGS. 3 and 4.

As described above, the operator can display the pointer or fix the pin by operating the operating pen 20. Since the pointer is displayed as the position pointer and the direction pointer in conjunction with the movement operation and the rotation operation of the operating pen 20, a part to be noted can be indicated in an intuitive way. Moreover, since the pin is continuously displayed with the operation of fixing the pin, a spot to be noted can be properly indicated to viewers in combination with the pointer operation.

In this embodiment, the position pointer is displayed as a substantially circular image. Because a circle does not have a specific feature of indicating a direction, it is thought that the substantially circular image is easily acceptable as a shape indicating a position. Furthermore, with the rotation of the operating pen 20, the display of the position pointer is not changed, while only the direction pointer revolves along the periphery of the position pointer. Hence the operator can feel stable in pointer display.

By displaying the pointer and the pin in sizes larger than a certain size, higher viewability can be obtained than the case of indicating the part to be noted with the aid of a mouse pointer or a laser pointer. In addition, since the direction pointer can display the direction, it is possible to indicate the direction in which attention is to be focused.

In FIG. 7 illustrating the screen example in this embodiment, the pins M140 and M142 representing the fixed pins are displayed in the same images. However, numerals denoting the order in which the pins have been fixed may be displayed in a superimposed relation to the pin images such that the viewers can recognize the order in which the pins have been fixed. By displaying the order in which the pins have been fixed, it is possible to clearly represent the order in which the viewers are prompted to visually pursuit the parts to be noted.

2. Second Embodiment

A second embodiment will be described below. The second embodiment represents an embodiment in which the display device 10 receives the sensor information from a plurality of operating pens 20. Functional configurations of the display device 10, the display control device 15, each of the operating pens 20, and the reception device 30, as well as the processing flow in the second embodiment are the same as those in the first embodiment, and hence description of those points is omitted.

When the operating pens 20 transmit the sensor information, identification information for each of the operating pens 20 is included in the sensor information. Furthermore, from which operating pen 20 the sensor information has been transmitted is identified by the pen identification unit 140.

In the processing flow illustrated in FIG. 3, the sensor information received in step S102 and step S120 is identified for each operating pen 20, and the steps of calculating the pointer coordinates, displaying the pointer, generating the click, displaying the pin, and fixing the pin are executed for each operating pen 20.

Figure 8:
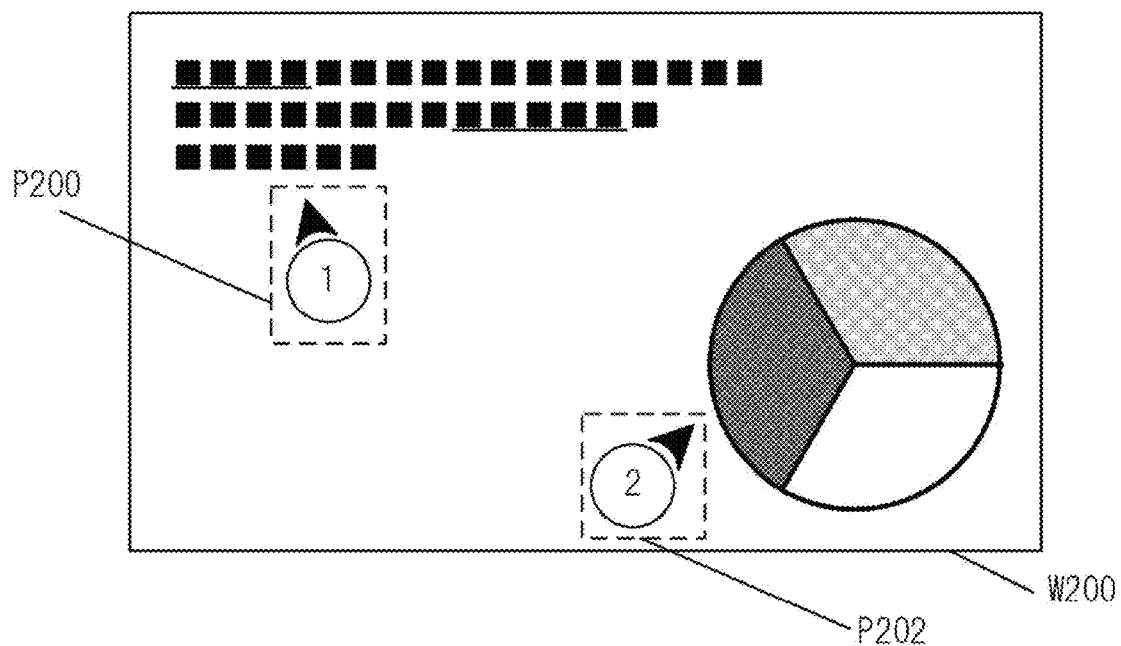
FIG. 8 is an illustration referenced to explain an operation in a second embodiment.

FIG. 8 illustrates a screen example. Two pointers P200 and P202 are displayed on a display screen W200. A numeral assigned for each operating pen is displayed as identification display at the center of a position pointer for each of the pointers P200 and P202. Thus, by changing a way of displaying the pointer for each operating pen 20 and allowing the operator to recognize the identification display (numeral), the operator can recognize the pointer that is operated by himself or herself.

The numeral displayed in the position pointer may be a numeral specific to each operating pen 20, or a number assigned depending on the order in which the pointer has been displayed. The identification display for the pointer may be presented in a manner of displaying, in the position pointer, a specific picture (e.g., an icon or a profile photo) other than the numeral in the above-mentioned example. Alternatively, colors assigned to the pointers may be changed. Although the identification display is given in the position pointer in the above-mentioned example, it may be given in the direction pointer or near the pointer.

Furthermore, the individual pin images may be displayed as pin images that are specifically colored for each operating pen 20, or pin images having different shapes. By changing the pin image for each operating pen 20, the operator can identify the pin that is operated by himself or herself, or the pin that has been fixed by himself or herself.

According to this embodiment, as described above, a plurality of operators are able to operate the pointers. Therefore, the operators can indicate the parts to be noted without sharing an operating device, such as a mouse, connected to the display device 10, and operation efficiency increases. Moreover, since the way of displaying the pointer is changed for each of the plurality of operating pens 20, an effect of suppressing the operations from being confused is expected even with the plurality of operators operating the operating pens 20 at the same time.

3. Third Embodiment

A third embodiment represents an embodiment in which only the direction pointer is displayed as the pointer. Thus, in the third embodiment, the position pointer displayed in the first embodiment and the second embodiment is omitted, and the direction and the position are both expressed by the direction pointer.

The third embodiment represents an embodiment in which the display device 10 receives the sensor information from a plurality of operating pens 20. Functional configurations of the display device 10, the display control device 15, each of the operating pens 20, and the reception device 30, as well as the processing flow in the third embodiment are the same as those in the first embodiment. The third embodiment is different from the first embodiment in displaying the direction pointer at the pointer position in the pointer display process in step S116.

Figure 9:
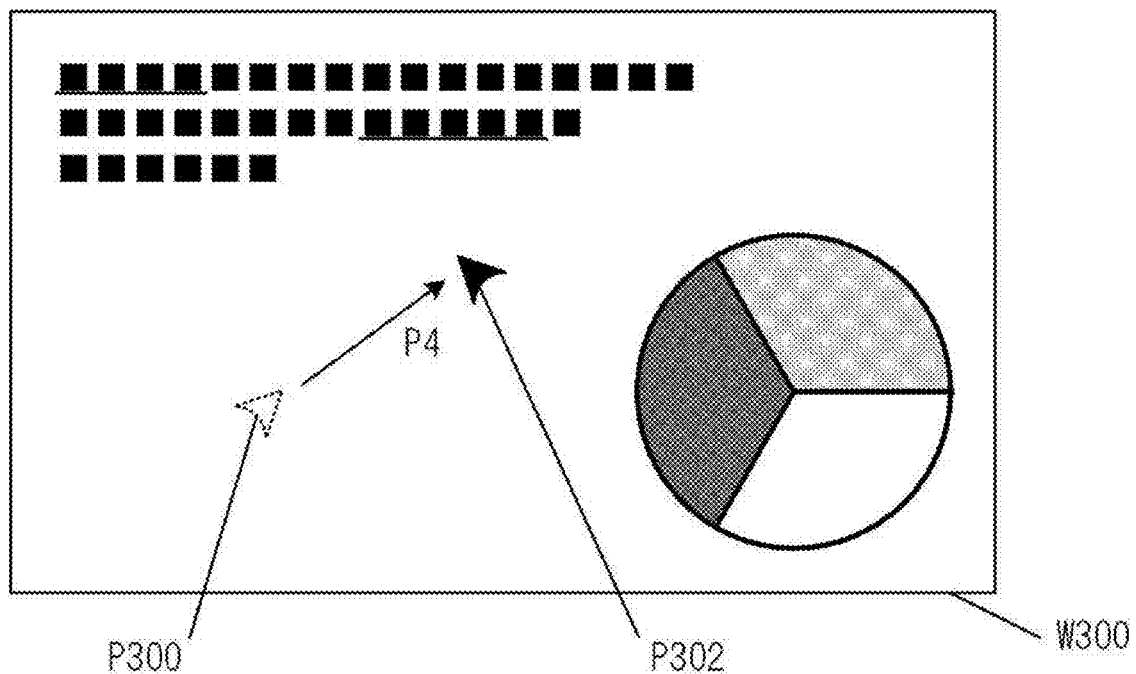
FIG. 9 is an illustration referenced to explain an operation in a third embodiment.

FIG. 9 illustrates a screen example. Assume here that a direction pointer P300 is displayed on a display screen W300 at a position denoted by a dotted line at a certain point in time. When the operating pen 20 is moved in a direction from a lower left corner toward an upper right corner and is rotated counterclockwise from the above state, the direction pointer is moved in a direction denoted by P4 and is displayed as denoted by P302.

In this third embodiment, an area occupied by the pointer can be reduced in comparison with that in the first embodiment. Since only the direction pointer is displayed and an area of an object, etc., which is hidden by the pointer, is reduced, the third embodiment is effective particularly when there is a possibility that many pointers are displayed.

4. Fourth Embodiment

A fourth embodiment will be described below. The fourth embodiment represents an embodiment in which the display mode is switched over from the pointer to the pin by a different method from that in the above-described embodiments. Functional configurations of the display device 10, the display control device 15, the operating pen 20, and the reception device 30, as well as the processing flow in the fourth embodiment are the same as those in the first embodiment, and hence description of those points is omitted.

Although, in the above-described embodiments, the pointer display and the pin display are switched over depending on the rotation angle, the display mode may be switched over with a gesture operation, for example.

Several examples of the gesture operation are as follows. The pointer display and the pin display are switched over with an operation of reversing the operating pen 20 (e.g., an operation of flipping the operating pen 20 such that the pen tip and the pen backend (pen tail) are reversely positioned). In another example, the display mode is switched over to the pin display when the operator rotates the operating pen 20 at a speed corresponding to a predetermined threshold (namely, at a speed higher than an ordinary speed). In still another example, the display mode may be switched over to the pin display upon the operator shaking the operating pen 20.

In other words, various motions are conceivable as the motions for switching over the display mode from the pointer display to the pin display. Thus, twisting the operating pen 20 to be oriented downward is regarded as the switching motion in the first embodiment, etc., but another kind of motion may be regarded as the switching motion as in this fourth embodiment.

Moreover, the pointer and the pin may be switched over at whatever time. Alternatively, once the pin is displayed, the state in which the pin is displayed may be maintained. For example, once the pin is displayed (step S118) in accordance with the determination in step S114 of FIG. 3, the pin display is maintained thereafter. In other words, the pin is continuously displayed until the pin display (or the pointer display) is erased.

5. Fifth Embodiment

A fifth embodiment will be described below. Although, in the above-described embodiments, the direction pointer indicating the rotation direction is also displayed depending on the rotation of the operating pen 20, only the position pointer may be displayed without displaying the direction pointer.

More specifically, the pointer is displayed in conjunction with the operating pen 20 on the basis of the sensor information received from the operating pen 20. In that state, the rotation angle is calculated from the sensor information, and the display mode is switched over to the pin display when the calculated rotation angle comes to the pin switching angle at which the display mode is to be switched over to the pin display.

For instance, only the ordinary position pointer is displayed in step S116 of FIG. 3. When the rotation angle comes to about 180 degrees, the display mode is switched over to the pin display.

6. Operational Effects and Modifications

Although the embodiments of the present disclosure have been described above in detail with reference to the drawings, practical configurations are not limited to those described in the embodiments, and designs, etc. not departing from the gist of the present disclosure are also included in the scope of Claims.

Let consider the case of using an electronic pointer capable of being operated while detecting a device motion, and of rotating a pointer image depending on an angle by which a device posture has been twisted. When a shape of the pointer image is designed as combination of a circle and a triangle moving around the circle in response to the twist, the pointer image resulting from twisting the device posture nearly upside down is similar to the shape of a pin that generally indicates a spot. With such a twist operation being a trigger, the pointer image can be completely changed to the pin-like shape, and a pin image can be fixed (namely, a pin can be inserted) to a designated point on a screen when a switching operation is performed in the above state. Although the pointer function is usually just able to indicate only one point at a time, the above-described function enables a plurality of points to be indicated at the same time. The above-described function can be intuitively invoked with the aid of image similarity or the twist operation, i.e., by a method not using a dedicated switch.

The programs running on the individual devices in the above embodiments are programs (computer operating programs) that control a CPU, etc. in a manner of implementing the functions of the above embodiments. Information handled by those devices is temporarily loaded into a temporary memory (such as a RAM) when the information is processed. Thereafter, the information is stored in at least one of various memories such as a ROM, a HDD, and an SSD, and is read by the CPU to be corrected or rewritten as appropriate.

The features of the above embodiments have been separately described in some cases for convenience of explanation, but those features may be implemented in a combined manner insofar as the combinations are technically allowable. For instance, the second embodiment and the third embodiment may be combined with each other. More specifically, in the case of making a presentation, a cursor corresponding to the operating pen 20 operated by a presenter displays the position pointer and the direction pointer, while a cursor corresponding to the operating pen 20 operated by a viewer displays only the direction pointer. Furthermore, colors of both the direction pointers are set to different colors. By changing a way of displaying the cursor between the presenter and the viewer as described above, it is possible to separately display the point to be emphasized by the presenter and the point noted by the viewer.

The above embodiments have been described in connection with a standing display device capable of detecting an operation input, as one example of display devices. However, the present disclosure can be further applied to other devices in which similar functions can be implemented. Thus, the features of the present disclosure may be implemented, for example, by illuminating a display screen onto a whiteboard or a wall surface with a projector, and by detecting pen operations with the projector or a separate detection device. The projector may be of the wall-mounted type or the desktop type. In other words, the display device includes not only an integral device capable of displaying an image and detecting an operation, but also separate devices that separately display an image and detect an operation.

In trying to distribute the programs to the market, the programs may be distributed to the market in a state stored in a portable recording medium, or may be transferred to a memory in a server computer that is connected via a network such as the Internet. In that case, the memory in the server computer is also included in the present disclosure.

The present disclosure contains subject matter related to that disclosed in Japanese Priority Patent Application JP 2017-167600 filed in the Japan Patent Office on Aug. 31, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display method used in a display control device connectable to an operating device including a sensor configured to detect, as sensor information, an indication of displacement of the operating device, and transmission circuitry that transmits the sensor information, the display method comprising:
    receiving the sensor information that indicates the displacement of the operating device from the operating device;
    determining a motion of the operating device on basis of the sensor information received from the operating device, and controlling display of a pointer that is displayed on a connected display in conjunction with the determined motion of the operating device; and
    calculating a rotation angle of the operating device on basis of the sensor information, and replacing the pointer with a pin and displaying the pin at a position where the pointer is displayed, when the calculated rotation angle comes to a switching angle.

2. A non-temporary recording medium storing a program to be loaded into a computer incorporated in a display control device connectable to an operating device including a sensor configured to detect, as sensor information, an indication of displacement of the operating device, and transmission circuitry that transmits the sensor information, the program causing the computer to execute:
    receiving the sensor information that indicates the displacement of the operating device from the operating device;
    determining a motion of the operating device on basis of the sensor information received from the operating device, and controlling display of a pointer that is displayed on a connected display in conjunction with the determined motion of the operating device; and
    calculating a rotation angle of the operating device on basis of the sensor information, and replacing the pointer with a pin and displaying the pin at a position where the pointer is displayed, when the calculated rotation angle comes to a switching angle.

* * * * *